May 18, 1926.

L. RONDOLIN 1,585,114

MACHINE FOR APPLYING CREAM AND LIKE MATERIALS TO BISCUITS AND THE LIKE

Filed Sept. 18, 1924  9 Sheets-Sheet 2

INVENTOR
Laurent Rondolin
By Dowell and Dowell
his Attorneys

May 18, 1926.

L. RONDOLIN 1,585,114

MACHINE FOR APPLYING CREAM AND LIKE MATERIALS TO BISCUITS AND THE LIKE

Filed Sept. 18, 1924  9 Sheets-Sheet 5

INVENTOR
Laurent Rondolin
By Dowell and Dowell
his Attorneys.

May 18, 1926.  1,585,114

L. RONDOLIN

MACHINE FOR APPLYING CREAM AND LIKE MATERIALS TO BISCUITS AND THE LIKE

Filed Sept. 18, 1924  9 Sheets-Sheet 6

INVENTOR
Laurent Rondolin
By Dowell &d Dowell
his Attorneys

May 18, 1926.
L. RONDOLIN
1,585,114
MACHINE FOR APPLYING CREAM AND LIKE MATERIALS TO BISCUITS AND THE LIKE
Filed Sept. 18, 1924      9 Sheets-Sheet 7
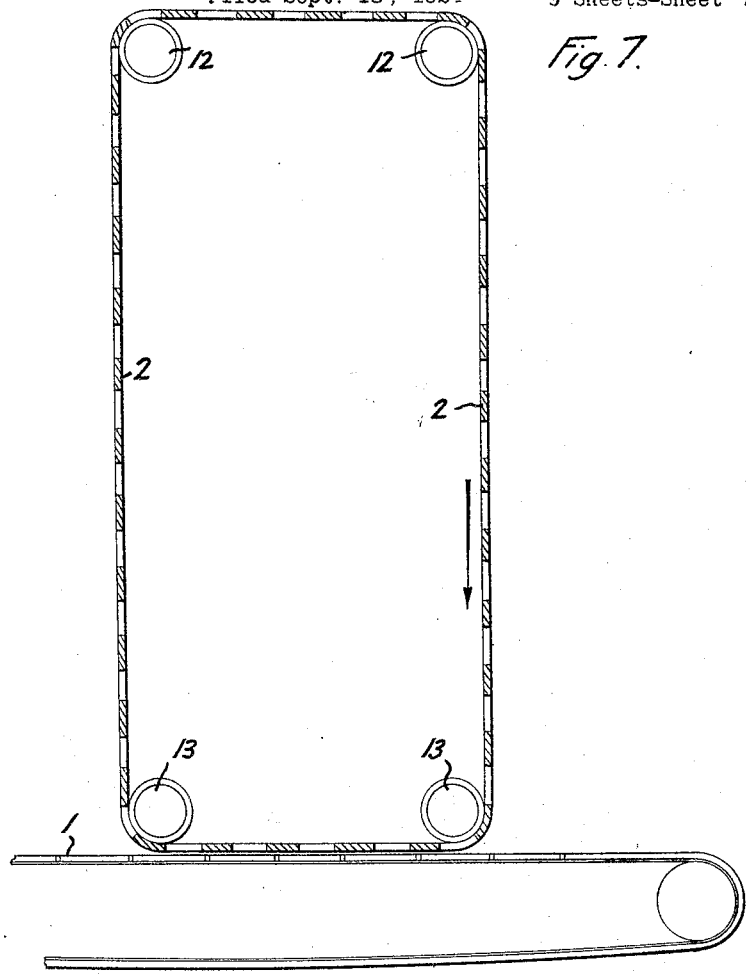
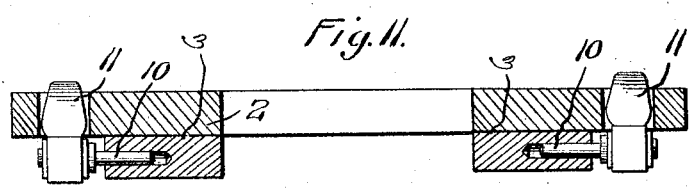
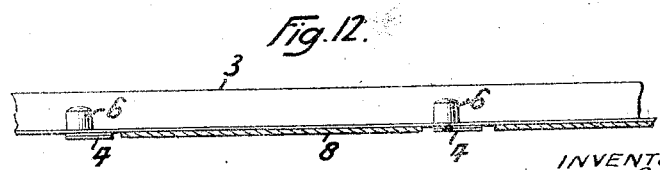
INVENTOR
Laurent Rondolin
By Dowell and Dowell
his Attorneys.

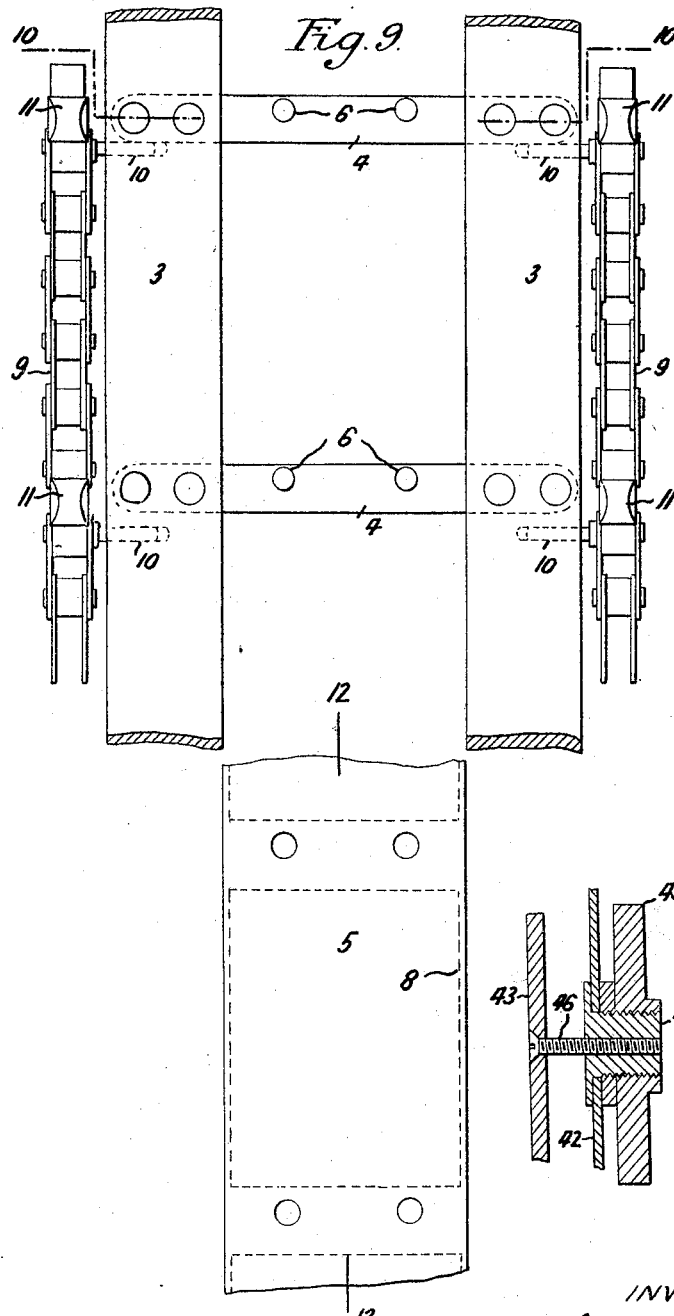

May 18, 1926.
L. RONDOLIN
1,585,114
MACHINE FOR APPLYING CREAM AND LIKE MATERIALS TO BISCUITS AND THE LIKE
Filed Sept. 18, 1924   9 Sheets-Sheet 9

INVENTOR
Laurent Rondolin
By Dowell & Ed Dowell
his Attorneys.

Patented May 18, 1926.

1,585,114

UNITED STATES PATENT OFFICE.

LAURENT RONDOLIN, OF BERMONDSEY, LONDON, ENGLAND, ASSIGNOR TO PEEK FREAN & COMPANY, LIMITED, OF LONDON, ENGLAND.

MACHINE FOR APPLYING CREAM AND LIKE MATERIALS TO BISCUITS AND THE LIKE.

Application filed September 18, 1924. Serial No. 738,375.

This invention relates to machines of the kind in which material such as cream and the like is applied to biscuits and the like, automatically from a hopper with the aid of two endless travelling webs one whereof serves to support the biscuits or other articles whilst the other which surmounts the same serves as a shape and thickness determining controller for the coating to be applied.

The object of the present invention is to effect certain improvements more particularly directed to the securing of the requisite sequence of operations in a thoroughly reliable manner with little liability to interference on account of the sticky nature of the coating material employed, whereby it is possible to manufacture satisfactorily, with little attention, so called sandwich biscuits comprising a filling disposed between two plain biscuits, the result being continuous delivery of properly finished and squared up products.

Figure 1:
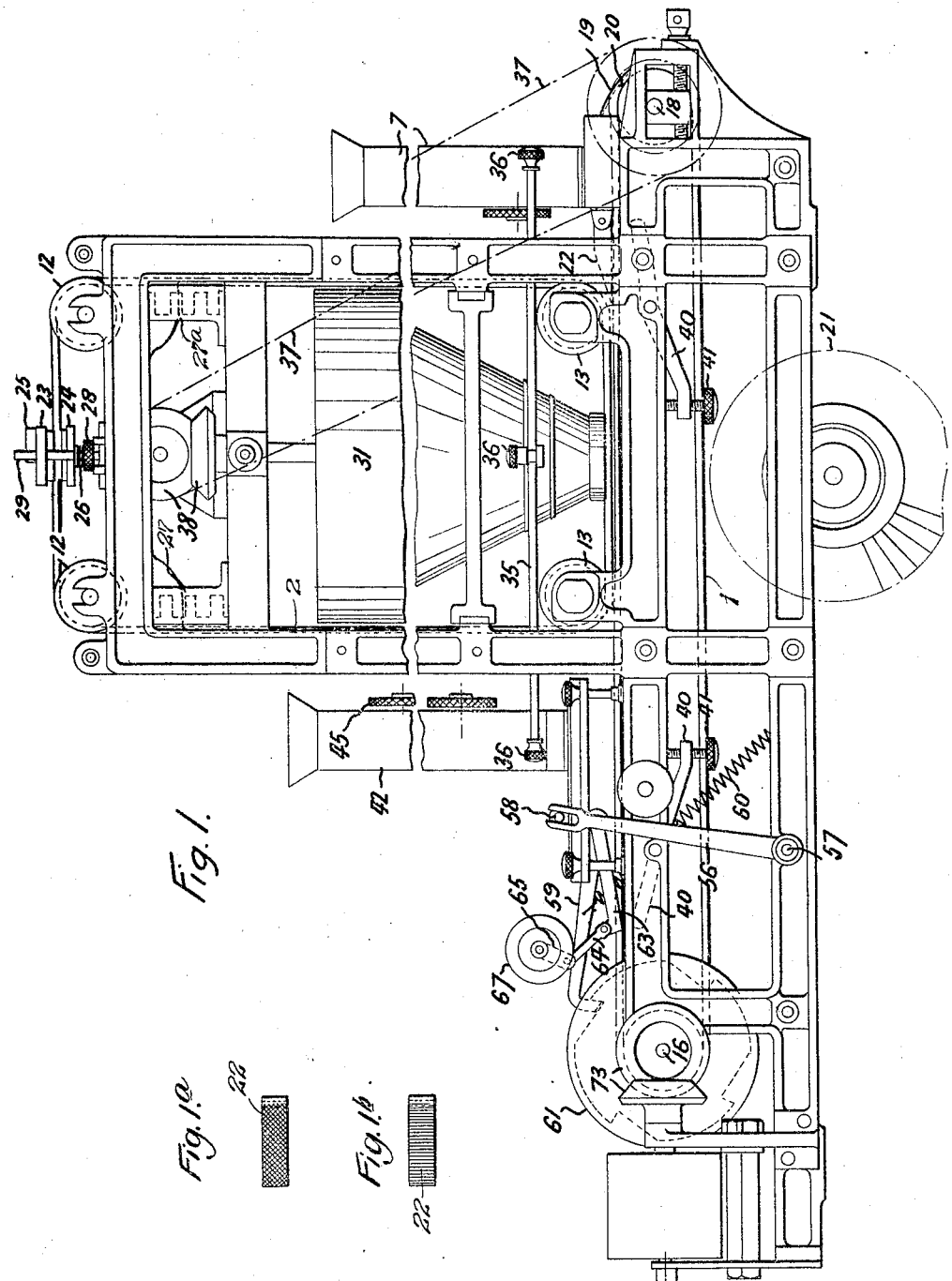
Figure 10:
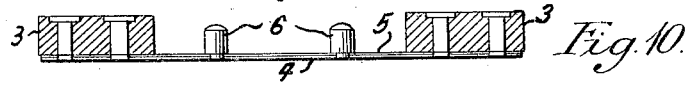
Figure 14:
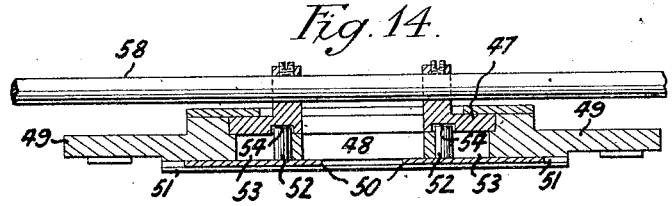
Figure 15:
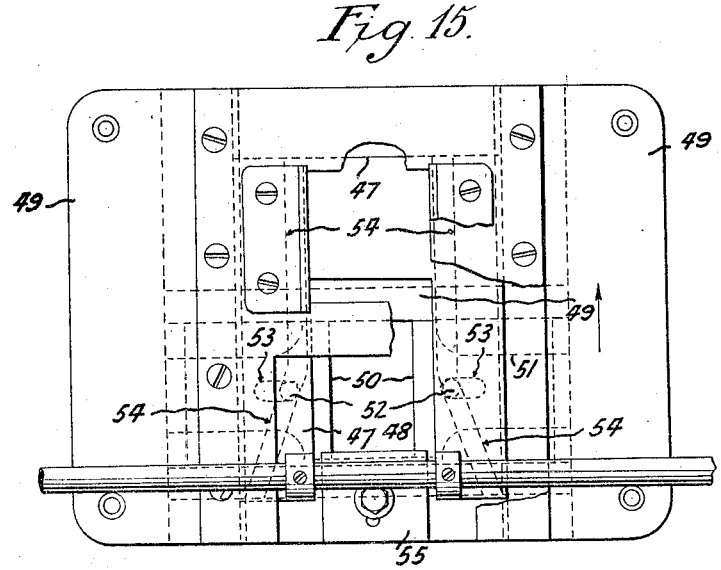
Figure 16:
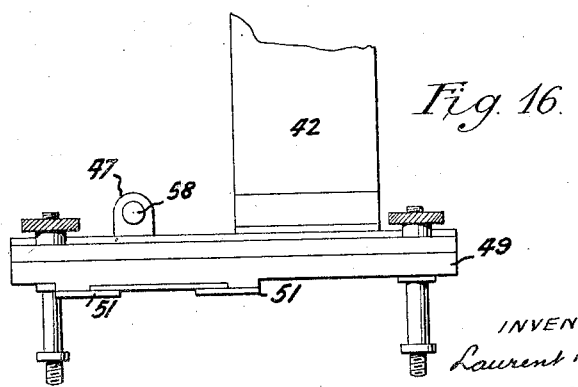

To this end a machine according to the invention, comprises the various arrangements and combination of parts hereinafter described with reference to the accompanying drawings whereof Fig. 1 is a side elevation and Fig. 2 a plan, Figs. 3 and 4 being end elevations looking at Fig. 1 from the left and right hand side respectively. Figs. 1ª and 1ᵇ are underside views of a detail of Fig. 1. Fig. 5 is a longitudinal section and Fig. 6 a cross section of the machine. Fig. 7 is a semidiagrammatic elevation of the belts of the machine and Fig. 8 is a sectional plan of the lower part of the machine. Fig. 9 is a plan to a larger scale of a portion of the lower belt of Fig. 7. Figs. 10, 11 and 12 are sections corresponding to the lines 10—10, 11—11, 12—12 of Fig. 9. Fig. 13 is a sectional view to a larger scale of a part of Fig. 5. Fig. 14 is a sectional elevation to a larger scale of a part of Fig. 3. Fig. 15 is a plan with parts removed corresponding to Fig. 14 and Fig. 16 is a part sectional elevation at right angles to Fig. 14.

Figure 5:
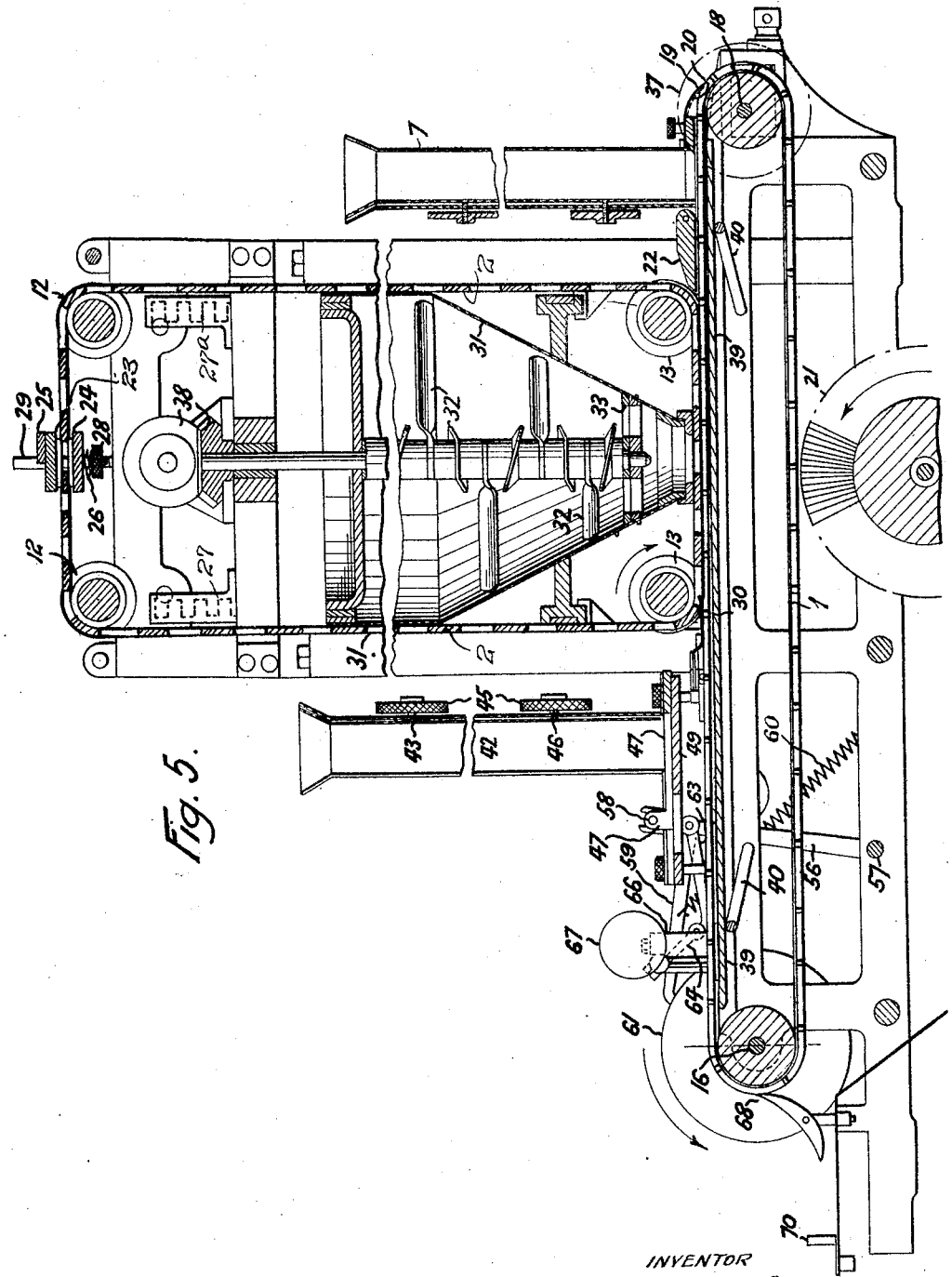
Figure 6:
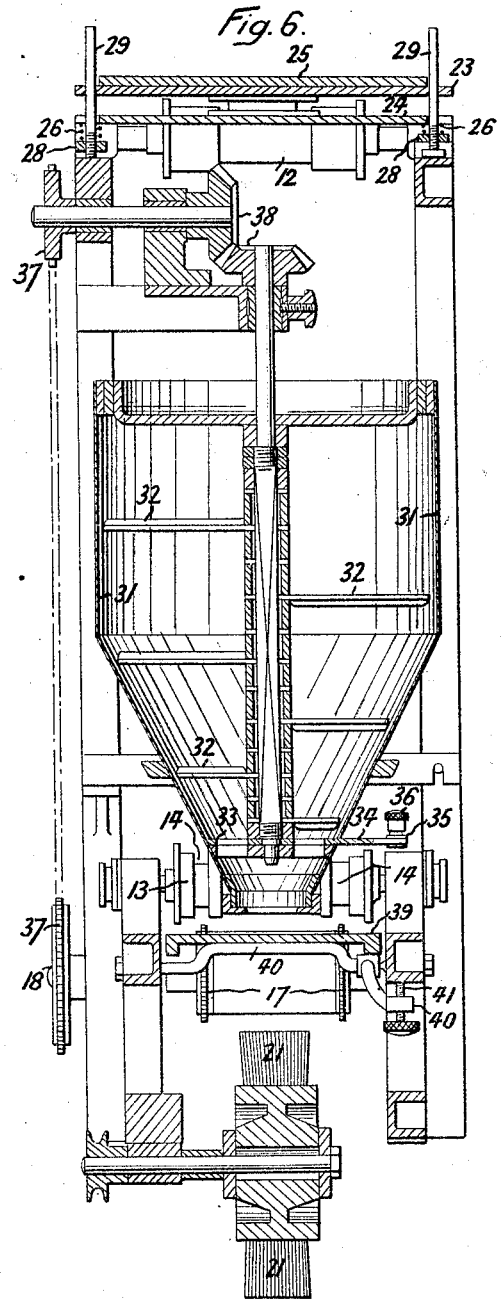

In this machine the biscuit blanks are received in succession upon an endless carrier belt 1 with which is associated a stencil belt 2 arranged as shown in Fig. 7. The carrier belt 1 as shown in Figs. 9 to 12 consists of two relatively thick but narrow lengths or runs 3 of leather or the like spaced apart and held at the proper distance one from the other by transverse metal ties 4 adapted to support a thinner mid-run 5 of suitable material such as a silk belt which serves to directly receive the biscuit blanks and is interrupted at intervals by pins 6 adapted to dislodge blanks from a guide container 7 (Figs. 1 and 5) into which they are initially fed and which they descend by gravity, said pins 6 being riveted to the ties 4. If desired, canvas and like pads 8 may be sewn to the underside of the silk belt 5 substantially equal in thickness to the ties 4. The spaced runs 3 may be secured to the driving chains 9 by pins 10 that project laterally from certain of the chain links, certain other links having studs 11 adapted to cooperate with holes in the stencil belt 2 which is thus driven, such an arrangement ensuring register between the biscuit blanks and stencil perforations in the belt 2, through which the cream or the like passes, that is not attainable or easily attainable by independent positive driving of the belts. The belt 2 travels around a pair of upper rollers 12 and a pair of lower rollers 13 which latter are, as shown in Figs. 6 and 8 formed with annular grooves 14, to clear the studs 11 of the carrier belt 1 the chains 9 of which pass around a pair of sprocket wheels 15 on the shaft 16 and another pair of sprocket wheels 17 on the shaft 18.

As the carrier belt 1 approaches the guide container 7 the mid-run 5 encounters means such as a spring finger 19 that serves to keep the belt down, said finger being if desired provided with a layer 20 of wiping material to remove final traces of stickiness from the mid-run 5. The finger 19 is narrow enough to allow the pins 6 to pass to opposite sides thereof. 21 is a rotary brush associated with the underside of the lower run of the carrier belt adapted to brush the latter so that it is presented in a clear and satisfactory condition at the position where the biscuit blanks are supplied, that is to say at the guide container 7. A pivoted gravity member 22 which may have a slightly serrated under surface as shown in either Fig. 1ª or Fig. 1ᵇ may be arranged to bear upon and guide the blanks as they leave the container 7. The stencil belt 2 which is in direct contact with the coating material and hence more liable to cause trouble is adapted to be wiped on both sides preferably by passage between scraper members 23, 24 located intermediate of the rollers 12 one of which members 23 is gravity actuated as by a weight 25 and opposes upward movement of the other 24 under the influence of springs 26, it being convenient in addition to employ an electric or like heater 27 to warm the belt 2 prior to the wiper being reached or two such heaters 27, 27ª, to warm the belt both before and after being wiped. The wiping means may be furnished with adjusting devices such as nuts 28 working upon screwthreaded portions of pins 29 that serve as guides for the members 23, 24. As a further safeguard, to prevent a stencilled biscuit being carried round by the stencil belt 2, stripper fingers 30, Figs. 5 and 8 may be employed extending close to the latter at or near the position where the advancing edge of the coated biscuit should ordinarily leave the stencil belt. The filling material is contained in a vertical hopper 31 provided with a forcing down screw or paddle arrangement 32, and with a rotary cut off plate or hit and miss device 33 to which is linked through an arm 34 a pull and push rod 35, handles 36 being provided whereby such device can be instantly manipulated from any one of a number of points should any derangement be observed. The screw 32 is driven from the shaft 18 through chain and sprocket gear 37 and bevel wheels 38.

In order that it may be possible to control the thickness of the material deposited from the hopper, the carrier belt 1 is supported by a table 39 that is carried upon crank rods 40 or the like capable of being minutely adjusted through screws 41.

The biscuit blanks that complete the sandwich are automatically supplied from a storage receptacle 42, which like the container 7 consists of a hopper or tube having an inner false wall 43 such as shown in Fig. 13 capable of adjustment to suit different sized biscuits as by means of nuts 44 held against axial movement but rotatable by milled discs 45 and co-acting with screws 46 attached to the wall 43. At the bottom of the receptacle 42 a slide 47, Figs. 14 and 15, is provided to take one biscuit at a time. The biscuit is carried or displaced by the slide 47 into an opening 48 formed in a stationary plate 49 wherein the slide 47 operates, which opening by means of a pair of shutters 50, forms a recess for the temporary holding of the biscuit blank. At the proper time the recess 48 is opened at the bottom and the biscuit falls on to the coated biscuit which is carried forward by the carrier belt. The release of the biscuit is effected simultaneously at opposite edges so that it falls evenly, a convenient method of so ensuring this result being to mount the shutters 50 in guides 51 transverse to the guide for the main slide 47 and to actuate the shutters from the slide 47 by a cam and pin arrangement, comprising for example the pins 52 upon the shutters passing through guide slots 53 in the plate 49 and entering grooves 54 in the underside of the slide 47, the shape of the grooves 54 being clearly shown in Fig. 15 where the slide is in an intermediate position. When fully retracted in the direction of the arrow, the pins 52 will have progressed along the portions of the groove 54 inclined to the direction of travel, when the shutters will be entirely withdrawn leaving the opening 48 perfectly free, whereas complete advancement of the slide 47 in the opposite direction will conversely cause the pins to enter the portions of the grooves parallel to the line of travel when the shutters will be extended further into the opening 48. 55 is an adjustable stop for varying the effective size of the opening 48 in the plate 49.

The operating means for the slide 47 may be of any suitable kind such as forked arms 56 pivoted at 57 and engaging the ends of a spindle 58 carried by the slide 47, one arm 56 being connected to a drag pawl 59 which is intermittently advanced against the action of a spring 60 Fig. 5 by a toothed disc 61 connected to the shaft 16 of the machine which is driven by the sprocket wheel 62. This arm 56 has also pivoted thereto an arm 63 linked to an adjustable bell crank system of arms 64, 65 mounted in a bearing 66, the arm 65 carrying a roller 67 which can be thus caused to lightly press the upper biscuit blank on to the coating of the lower biscuit blank.

Figure 2:
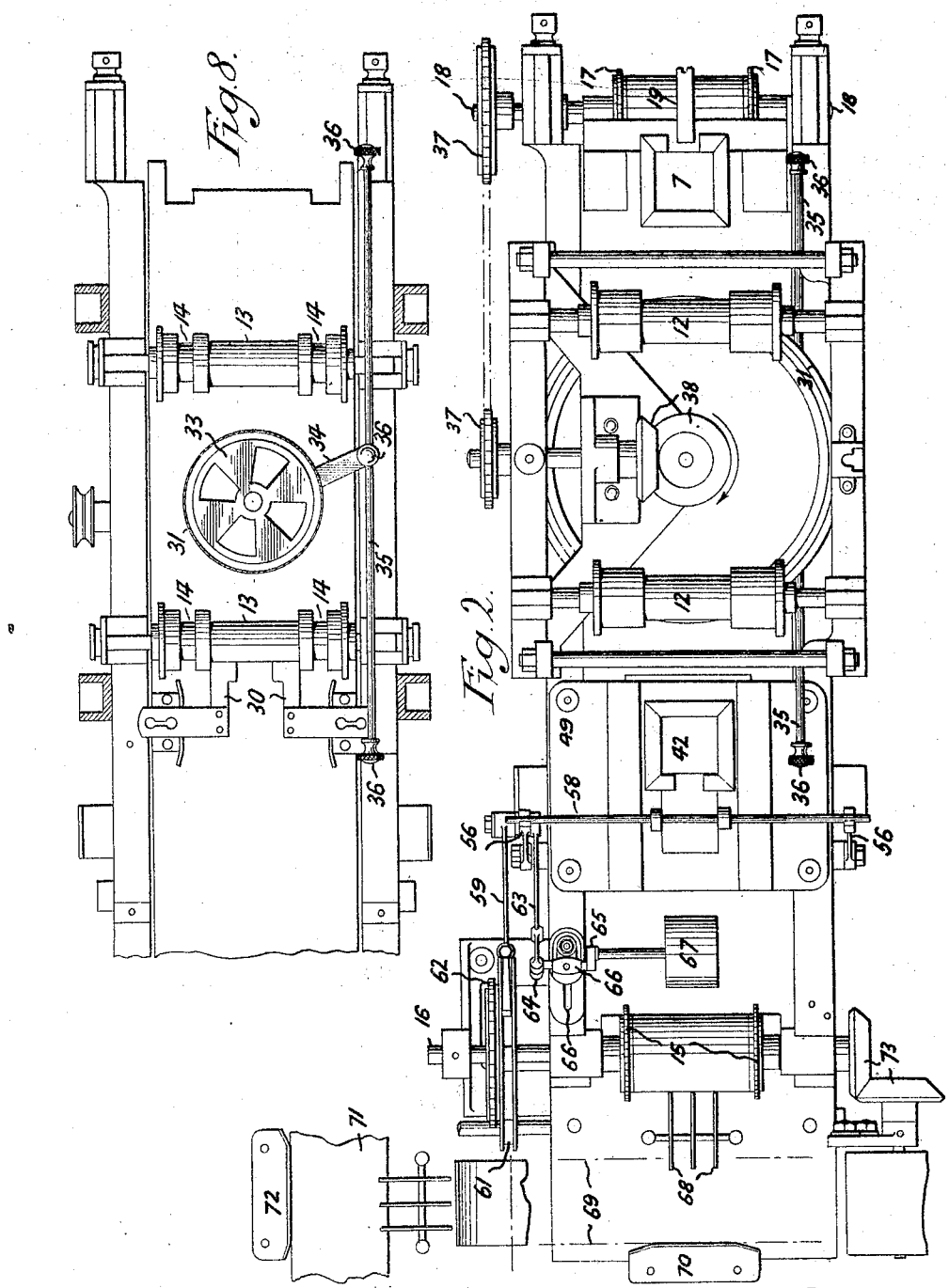
Figure 3:
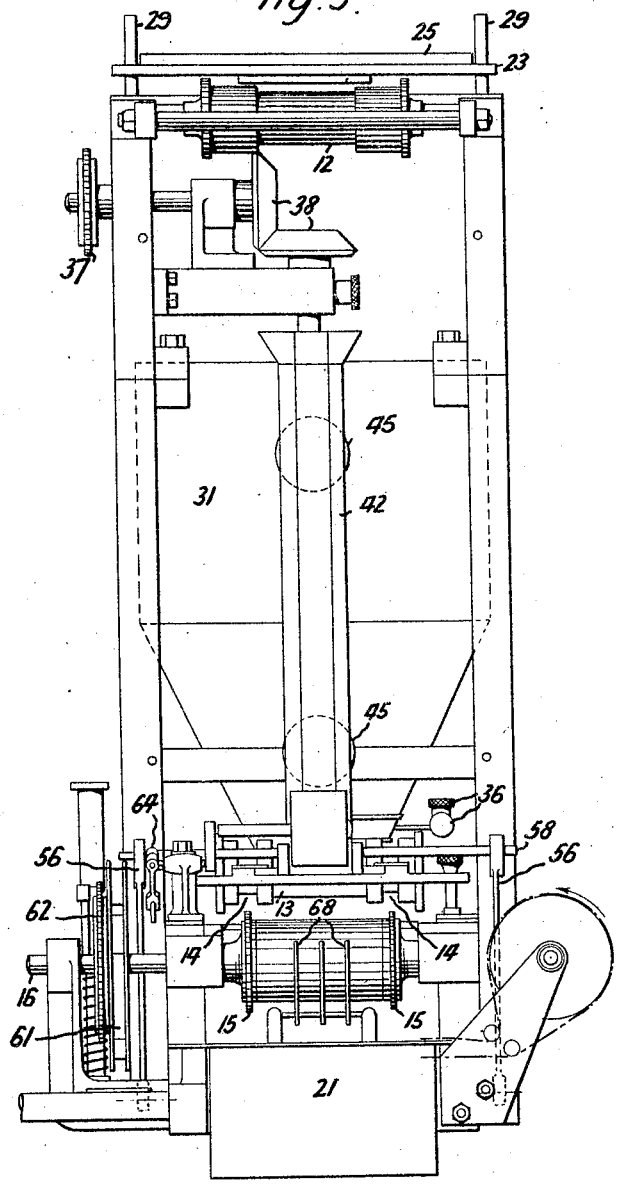
Figure 4:
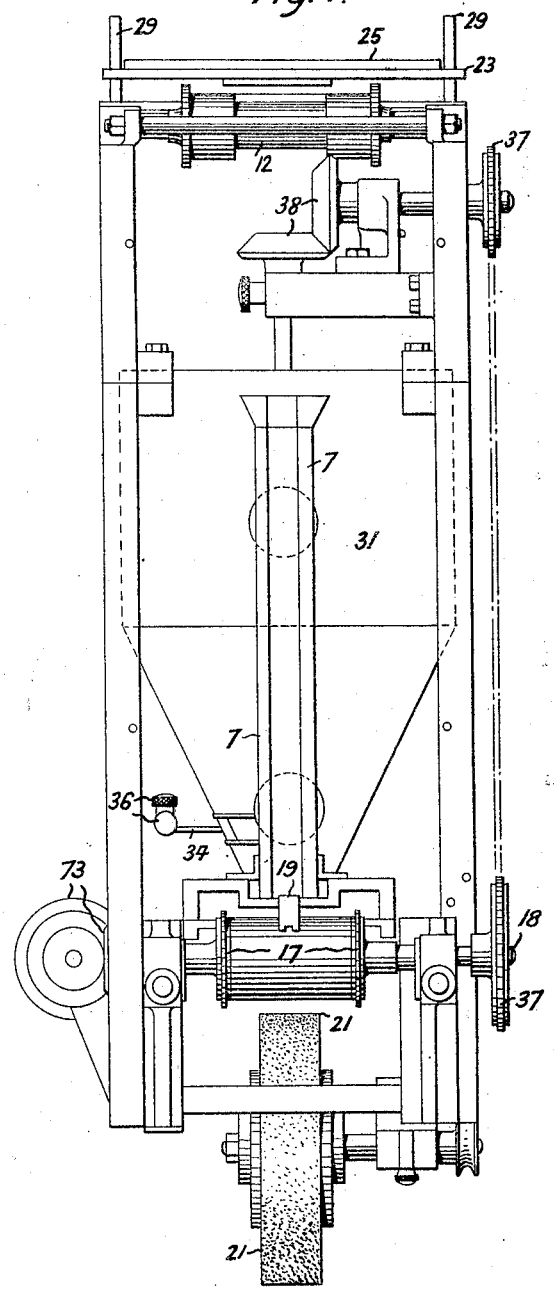

The complete sandwich is then peeled off from the end of the carrier belt 1 by the fingers 68 and made to fall on a moving conveyor 69, but against a stop 70 in order to square it up in one direction; this operation being repeated in the other direction when the biscuits fall from this conveyor 69 on to another conveyor 71 similarly fitted with a stop 72. 73 Figs. 1, 2 and 4 represents a bevel gear through which the conveyor 69 is driven from the shaft 16.

Briefly the operation of the machine is as follows:—

The container 7 is hand filled with a number of bottom biscuit blanks and the storage receptacle similarly filled with a number of top biscuit blanks, the hopper 31 being filled with the cream that is to complete the sandwich.

As soon as the shaft 16 is rotated by its sprocket wheel 62 the carrier belt 1 is caused to travel, in doing which the studs 11, Fig. 11, produce a synchronous travel of the stencil belt 2. The biscuit blanks from the container 7 drop successively into place upon the carrier belt 1 and later register with the openings in the stencil belt so that when the outlet to the hopper 31 is reached the required quantity of cream is deposited thereon. As each creamed bottom blank reaches the aperture 48 of the stationary plate 49 associated with the receptacle 42 the shutters 50 which have erstwhile supported a top biscuit blank dislodged from the receptacle 42 are actuated to liberate the blank which then falls upon the creamed blank and is ready to be acted upon by the pressing roller 67 which is temporarily caused to bear upon it. From this point the sandwich biscuits are advanced until the strippers 68 are encountered when the biscuits are transferred to the conveyor 69 and the parts simultaneously squared about one edge if necessary. The transference of the biscuits from the conveyor 69 to the conveyor 71 similarly results in the squaring of the biscuit parts about edges at right angles thereto.

What I claim is:—

1. In a machine of the kind herein referred to, an endless carrier belt, an endless stencil belt cooperating with such carrier belt, and means whereby one belt is directly driven by the other, substantially as described.

2. In a machine of the kind herein referred to, a carrier belt, a stencil belt cooperating with such carrier belt, a pair of endless chains supporting the carrier belt and having studs adapted to simultaneously drive the stencil belt, substantially as described.

3. In a machine of the kind herein referred to, a container for biscuit blanks, a carrier belt having a straight and substantially horizontal run near the rear end of which the container is located and adapted to abstract blanks from the container, sprocket wheels over which the belt travels before reaching the container and a spring finger adapted to encounter and bear upon said belt whilst passing over the said sprocket wheels and hold it down as the container is approached.

4. In a machine of the kind herein referred to, a container for biscuit blanks, a carrier belt having a straight and substantially horizontal run near the rear end of which the container is located and adapted to abstract blanks from the container, sprocket wheels over which the belt travels before reaching the container, a spring finger exerting an effort towards the belt whilst passing over the said sprocket wheels and a layer of wiping material adapted to be pressed by the finger against the belt and remove final traces of stickiness, substantially as described.

5. In a machine of the kind herein referred to, a carrier belt, a container adapted to deliver biscuit blanks to the belt, and a pivotal member having a slightly serrated under surface adapted to bear by gravity upon and guide the blanks as they leave the container, substantially as described.

6. In a machine of the kind herein referred to, a stencil belt and scraper means whereby the same is frictionally wiped on both sides simultaneously, substantially as described.

7. In a machine of the kind herein referred to, a stencil belt, a spring influenced wiping member located at one side of the belt and a gravity actuated wiping member located at the opposite side of the belt, the belt passing between said members and being simultaneously wiped on both sides, substantially as described.

8. In a machine of the kind herein referred to, a stencil belt, means for wiping the same on both sides simultaneously and means for warming the belt prior to the wiping means being reached, substantially as described.

9. In a machine of the kind herein referred to, a stencil belt, means for wiping the same on both sides simultaneously and means for warming the belt both before and after being wiped, substantially as described.

10. In a machine of the kind herein referred to, the combination with a carrier belt, and a stencil belt driven thereby so that biscuit blanks can be engaged therebetween and advanced thereby, of stationary stripper fingers extending close to the stencil belt at or near the position where the advancing edge of the coated biscuit should ordinarily leave the stencil belt and adapted to guide the biscuit blanks off the stencil belt, substantially as described.

11. In a machine of the kind herein referred to, a biscuit blank storage receptacle comprising a tube, an inner false wall at one side thereof, screws secured to the said wall and extending through the tube, nuts held against axial movement engaging said screws and milled discs whereby the nuts can be rotated in order to adjust the position of the inner wall, substantially as described.

12. In a machine of the kind herein referred to, a biscuit blank storage receptacle, open at the bottom, a stationary plate having an opening out of register with the open end of the receptacle, a slide adapted to be moved between the stationary plate and receptacle, having an opening adapted to receive a blank from the receptacle and to convey it to the opening in the stationary plate, laterally movable means adapted to hold the blank at two opposite edges when in the opening in the stationary plate and means whereby the said laterally movable means are independently actuated to effect release of the biscuit blank at opposite edges and permit it to fall evenly by gravity through the opening in the stationary plate, substantially as described.

13. In a machine of the kind herein referred to, a stationary plate having an opening thereon, a slide having a similar opening therein adapted to be moved to bring such opening into register with the opening in the stationary plate, a pair of shutters movable towards each other in paths at right angles to the path of movement of the slide aforesaid and cam means operatively connecting the slide and shutters so that as the result of movement of the slide in one direction the shutters are completely separated when the slide and plate openings are in register and conversely closed and remaining closed with continued movement of the slide in the opposite direction, substantially as described.

14. In a machine of the kind herein referred to the combination with a carrier belt, a companion stencil belt directly driven by the latter, a container for biscuit blanks adapted to be fed on to the carrier belt, a receptacle containing a coating material to be applied to the first named blanks through the stencil belt, a second container for covering biscuit blanks and means for transferring the covering blanks to the coating upon the first named blanks, of means adapted to press the covering blanks upon such coatings and means for intermittently bringing the pressing means into operation, substantially as described.

15. In a machine of the kind herein referred to, a carrier belt for sandwich biscuits, a conveyor belt at right angles thereto, at a lower level, and separated from the delivery end of the carrier belt by a horizontal gap, stripping means bridging said gap and a stop opposite such means and adjacent the remote edge of the conveyor belt against which the sandwich biscuits are caused to strike in the act of transference from the carrier belt to the conveyor by the stripping means, in order that the two parts of the biscuit may be squared up in one direction, the biscuits travelling in the same position upon both the carrier belt and conveyor, a second conveyor belt at right angles to the first named conveyor, at a lower level thereto and separated therefrom by a horizontal gap, stripping means bridging this gap and an associated stop adapted to similarly square up the parts of biscuits in directions at right angles to the first direction, substantially as described.

16. In a machine of the kind herein referred to, a carrier belt for sandwich biscuits, a conveyor belt at right angles thereto, stripping means adapted to transfer the biscuits from the carrier belt to the conveyor, a stop against which the biscuits strike in the act of such transference, in order to be squared up in one direction, a second conveyor belt at right angles to the first named conveyor belt, stripping means adapted to transfer the biscuits that have been squared up on the first conveyor to the second conveyor and a stop associated with such second conveyor against which the biscuits strike during the second transference in order to be squared up in the other direction, substantially as described.

Signed at London, England, this 6th day of September 1924.

LAURENT RONDOLIN.